Sept. 1, 1953  H. ROSSKOPF  2,650,803
FLUID-COOLED BLADE AND HEAT EXCHANGE MEANS THEREFOR
Filed June 12, 1951  2 Sheets-Sheet 1
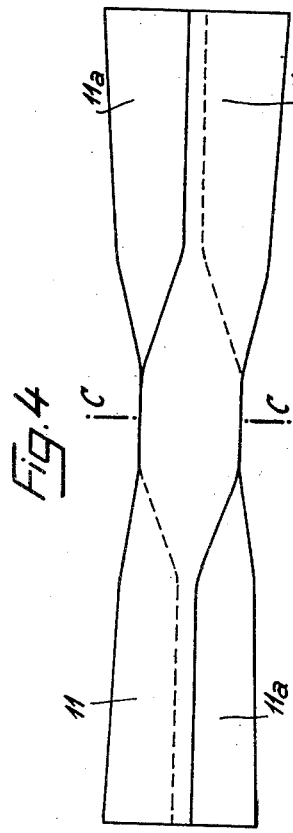
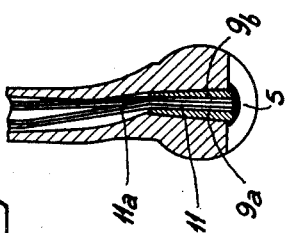
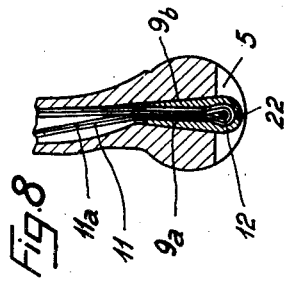
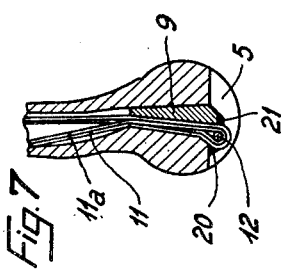
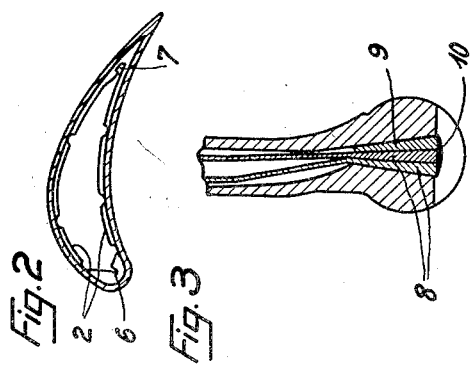

Sept. 1, 1953　　　　　　　　H. ROSSKOPF　　　　　　　2,650,803
FLUID-COOLED BLADE AND HEAT EXCHANGE MEANS THEREFOR
Filed June 12, 1951　　　　　　　　　　　　　　　　　2 Sheets-Sheet 2
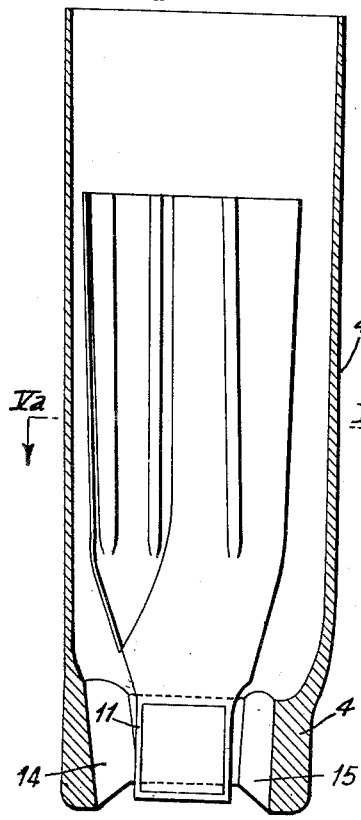
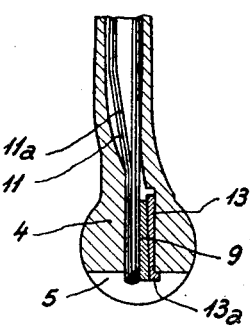
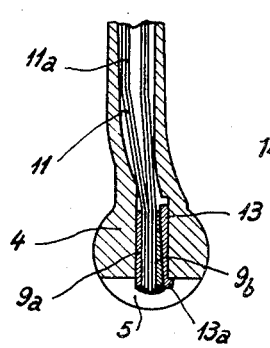
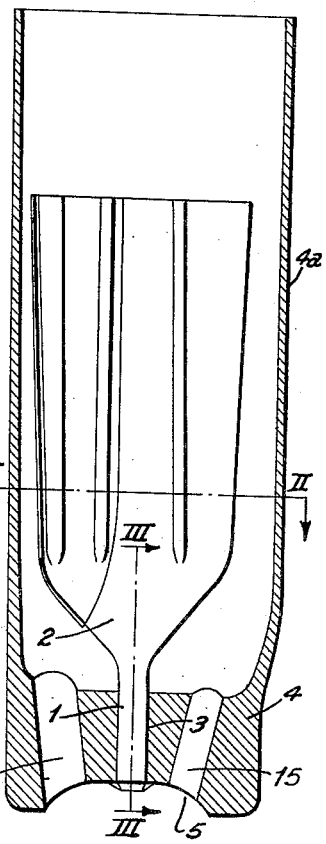
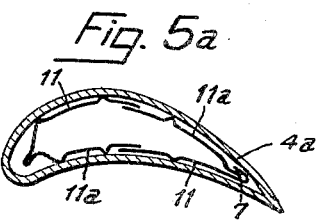
Hans Rosskopf
By Fraser, Myers & Manley
Att'ys.

Patented Sept. 1, 1953

2,650,803

UNITED STATES PATENT OFFICE 2,650,803

FLUID-COOLED BLADE AND HEAT EXCHANGE MEANS THEREFOR

Hans Rosskopf, Decize, Nievre, France, assignor to Hermann Oestrich, Decize, Nievre, France Application June 12, 1951, Serial No. 231,103
In France March 2, 1950

10 Claims. (Cl. 257—260)

It is well known that for employing cooling fluid, preferably air, at best, jackets or guiding means are arranged within hollow blades for guiding the fluid along the inner surface of the blade and in some cases for additionally contributing in damping vibrations.

In constructing and securing such guiding means, contradictory requirements as also for the blade itself are to be complied with.

In spite of their having a high strength, the guiding means should further be light in weight and stiff in order that the centrifugal stress imposed thereon as well as that imposed on the support for the guiding means, and distortions arising from other factors, for example from heat and aerodynamic influences, can be kept within admissible ranges.

It is a first object of this invention to provide improved guiding means capable of meeting the above requirements. Another object is to provide a blade and guiding means assembly whereby the blade sleeve portion is relieved from the centrifugal force set up in the guiding means and which otherwise would be transmitted thereto.

According to this invention, I provide guiding means having a lower portion which is narrower than the fluid guiding upper portion and adapted to be fitted in a recess or aperture in the central part of the root portion of the hollow blade, so that the guiding means can be firmly supported in operative position by said lower portion thereof secured to the blade root portion in said aperture, and air or other cooling fluid can be passed to the annular space between the upper portion of the guiding means and the inner wall of the hollow blade, through perforations provided through the blade root portion laterally, with respect to the central aperture.

The guiding means are given such a cross-section in the upper portion thereof, as to suit the inner shape of the blade, leaving an annular space for passage of cooling fluid along the inner surface of the blade. The guiding means may be produced from one blank which is stamped and drawn to the required shape, or from a pair of sections produced from sheet metal, each of which is bent to provide a shell in its upper portion, the shells being assembled together along their side edges, for example by welding.

The lower portion or appendix of the fluid guiding means may be secured to the blade root portion by welding the parts together. Alternatively it may be secured by means of one or more wedges and the parts may be further welded together, the welding bead or beads being preferably arranged to seat in the aperture at the bottom end thereof.

Further characteristics and objects of my invention will become apparent as the specification proceeds.

Particulars of guiding means and fixation thereof will now be described with reference to the accompanying drawings which are given by way of example merely to illustrate my invention but are not limiting.

Fig. 1 is an elevation partly in lengthwise section of the lower portions of guiding means and a hollow blade in which the guiding means are secured.

Fig. 2 is a cross-section along line II—II on Fig. 1.

Fig. 3 shows a modification in longitudinal section along line III—III on Fig. 1.

Fig. 4 is a developed view showing sheet metal strips cut and superimposed for the production of the sleeve and root portions of guiding means according to an embodiment of this invention.

Fig. 5 is a view similar to Fig. 1, showing the lower and root portions of guiding means produced from sheet metal as illustrated by Fig. 4.

Fig. 5a is a cross-section taken along the line Va—Va of Fig. 5.

Figs. 6 to 10 are sections along line VI—VI on Fig. 5, illustrating alternatives in respect of the manner of securing root portions of guiding means in blade roots.

Referring to Fig. 1, means for guiding cooling fluid in a hollow blade 4a are provided with a foot or root portion 1 in the form of a stem, for example a stem having a square or circular cross-section. The root portion is integral with the upper portion 2 of the guiding means, being produced from one blank.

As an alternative, the upper portion 2 may be made from two shells rigidly assembled together, the root portion 1 being likewise produced from two, preferably symmetrical sections to provide a solid member.

The upper portion 2 is, for example, given a cross-section as illustrated by Fig. 2. The component shells are connected together at 6, 7, the assembly at 7 being reinforced by a bent edge as shown. The shells are made with a thickness that increases towards foot portion 1 to correspond with the lessening width illustrated on Fig. 1, so as to preserve the required cross-section area in view of centrifugal stresses. The root portion 1 is set in a corresponding aperture 3 in the root portion 4 of the blade, and its lower part protrudes into a recess 5 in the lower face of root portion 4, where root portion 1 is secured preferably by welding as shown. The centrifugal force developed in the guiding means is thus transmitted through the foot portion of the blade, to a blade carrier (not shown) without loading the blade sleeve portion. As shown on Fig. 1, the root portion 4 of the blade has a pair of air ingress passages 14, 15 therethrough for receiving cooling air which delivered into recess 5 travels upwardly through said passages 14, 15 to be distributed into the intervening space between the inner wall of the hollow blade 4a and the outer wall of guiding means 2.

Instead of forming root portion 1 as a stem, I may also construct the same as a rectangular member of small height, whereby manufacture thereof is easier in some cases. The aperture in the blade root portion for accommodating the root portion of the guiding means instead of being produced by boring, may also be produced as a slot where the blade is manufactured by shaping or die pressing. In such a slot one or more passages may be arranged for cooling fluid from the blade carrier.

A flat shape for the root portion of the guiding means has the additional advantage of providing for a safer fixation where said portion tapers upwardly and the slot for accommodating it has a corresponding tapering shape. Such a structure is illustrated by Fig. 3, the root portion 8 being first jammed by means of one or more wedges 9 then welded as shown. The weld bead 10 is preferably arranged to maintain the initial jamming of wedge or wedges 9 and is thus less stressed than with a process of securing as illustrated by Fig. 1.

For the purpose of preserving the required cross-section area as above referred to, it is possible not only to shape the root portion as described but also to double the thickness in a suitable manner by superimposing or bending sheet metal members, for example sheet metal strips, which form a pair of shells. The shape and superimposing of such sheet metal members 11, 11a are visible on Fig. 4. By bending the assembly around line C—C, it is possible both to give a suitable cross-area to the root portion which is stressed in operation, and to increase thickness although the width is small. When the guiding means are set within the blade, the lower or root portion thereof is positioned as illustrated on Fig. 5. The root portion may be secured as shown on either Fig. 3 or Fig. 6. According to Fig. 6, instead of one wedge 9 (Fig. 3), there are two wedges 9a, 9b each on one side of the root portion. According to Figs. 7 and 8, a pin 12 is passed through the bent portion of sheet metal members 11, 11a and one wedge 9 or two wedges 9a, 9b are employed then the assembly is welded at 20, 21 (Fig. 7) or 22 (Fig. 8).

Instead of tapering upwardly, the slot adapted to receive the root portion of the fluid guiding means may have a constant cross-section whereby some advantages are obtained from the standpoint of manufacture. In such a case a desirable obliquity for one of the walls may be obtained by means of an auxiliary wedge 13 (Figs. 9 and 10) which is driven upwardly from below and held in its position by a lower toe portion 13a. According to Fig. 10, two wedges 9a, 9b are arranged on either side of the root portion to be nipped as already illustrated on Figs. 6 and 8. Other arrangements may be employed for the wedges.

As a modification, instead of bending the sheet metal member assembly 11, 11a along line C—C (Fig. 4), it may be cut along said line to be made up of four parts instead of two as shown in Fig. 5a. The assembly will then generally be secured in the hollow blade like the combination of bent members 11, 11a.

What I claim is:

1. The combination of an elongated blade comprising a root portion and a sleeve portion projecting upwardly from said root portion, said root portion having a central recess extending downwardly from its upper face, and marginal passage therethrough for ingress of an inwardly directed flow of cooling fluid into said sleeve portion; means in said sleeve portion providing a central obstacle in the upper part thereof, so as to leave an annular passage for cooling fluid between an upper portion of said means and the inner surface of said blade sleeve portion, said means having a lower thick portion of considerably less width than said upper portion, adapted and arranged to project into said recess; and means for securing said lower portion of said obstacle means in said recess.

2. The combination of claim 1, wherein said recess extends downwardly through said blade root portion to the lower face thereof, the combination further comprising a welding bead on the said lower face to seal the lower end of said recess.

3. The combination of claim 1, wherein said obstacle means comprises a pair of members, each of which includes a relatively wide upper portion providing a shell and a narrow, flat lower portion thicker than said upper portion, said members being assembled together along the side edges of said upper portions with the lower flat portions arranged in contacting relationship to form said lower thick portion of said obstacle means.

4. The combination of an elongated blade comprising a root portion and a sleeve portion projecting upwardly from said root portion, said root portion having a central aperture therethrough in lengthwise direction and being perforated longitudinally for ingress of an inwardly directed flow of cooling fluid; and means in said sleeve portion of the blade for guiding incoming fluid and distributing the same along the inner surface of said sleeve portion, said means comprising an upper section adapted and arranged to provide a central obstacle for said fluid in said blade sleeve portion, and a lower section of considerably less width than said upper section, adapted and arranged to project into said aperture; and means comprising a wedge between said lower section of said guiding means and a wall of said aperture for securing said lower section to said root portion of the blade.

5. The combination of claim 4, wherein the last-named means comprises a pair of wedges, each on one side of said lower section, between the same and the corresponding wall of said aperture.

6. For combination with an elongated blade having an upper sleeve portion and a lower root portion which is longitudinally perforated for ingress of a cooling fluid and has a central longitudinal aperture therethrough, a fluid guiding device which comprises a pair of facing shells secured together along their side edges to provide an assembly of such cross sectional dimensions and shape as to leave a narrow interval for passage of cooling fluid between said assembly and the inner wall of said hollow blade when said guiding means are in operative position, and means extending downwardly at the lower end of said assembly, providing an appendix of smaller cross sectional dimensions than said assembly for projecting into said aperture and being secured to said root portion.

7. The combination of claim 6, wherein said appendix means comprises a pair of flat extensions arranged in contacting relationship, each of which depends integrally from one of said shells.

8. For combination with an elongated blade having an upper sleeve portion and a lower root portion which is longitudinally perforated for ingress of a cooling fluid and has a central longitudinal aperture therethrough, a fluid guiding device which comprises a pair of symmetrical sections, each of which includes two sheet metal strips superimposed in V formation with an upwardly decreasing overlap, the upper portions of said sections being curved to provide opposite shells, said sections being assembled together with the lower portions of said sections in contacting relationship to provide a relatively narrow appendix capable of being fitted in said aperture, and with the upper portions attached together along the side edges of said shells.

9. The guiding device of claim 8, wherein the corresponding strips of each section are integral portions of two sheet metal lengths doubled back along a bending line at the bottom of said guiding device.

10. The guiding device of claim 9, wherein said lengths are so doubled back along said bending line as to provide a free cross space for accommodation of a pin.

HANS ROSSKOPF.

References Cited in the file of this patent

UNITED STATES PATENTS

| Number | Name | Date |
|---|---|---|
| 2,364,279 | Dodge | Dec. 5, 1944 |